(12) United States Patent
Din et al.

(10) Patent No.: US 8,909,161 B2
(45) Date of Patent: Dec. 9, 2014

(54) TRANSCEIVER FRONT-END

(75) Inventors: Imad ud Din, Lund (SE); Stefan Andersson, Lund (SE); Daniel Eckerbert, Lund (SE); Henrik Sjöland, Löddeköpinge (SE); Tobias Tired, Lund (SE); Johan Wernehag, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 127 days.

(21) Appl. No.: 13/586,480

(22) Filed: Aug. 15, 2012

(65) Prior Publication Data
US 2014/0011462 A1 Jan. 9, 2014

(30) Foreign Application Priority Data
Jul. 9, 2012 (WO) .................. PCT/EP2012/063429

(51) Int. Cl.
*H04B 1/38* (2006.01)
(52) U.S. Cl.
USPC ................... 455/73; 455/78; 455/83; 455/91; 455/130
(58) Field of Classification Search
CPC .................................. H04B 1/38; H04B 1/525
USPC .............. 455/73, 78, 83, 91, 107, 130, 248.1, 455/280, 168.1, 213, 306, 307
See application file for complete search history.

(56) References Cited

U.S. PATENT DOCUMENTS

| 2003/0128081 | A1 | 7/2003 | Ella et al. |
| 2006/0135084 | A1* | 6/2006 | Lee .................................. 455/78 |
| 2008/0279262 | A1* | 11/2008 | Shanjani ........................ 375/219 |
| 2010/0109800 | A1 | 5/2010 | Ueda et al. |
| 2011/0064004 | A1 | 3/2011 | Mikhemar et al. |
| 2011/0299433 | A1 | 12/2011 | Darabi et al. |
| 2013/0077540 | A1* | 3/2013 | Black et al. ................... 370/277 |

* cited by examiner

*Primary Examiner* — Tuan Pham
(74) *Attorney, Agent, or Firm* — Coats and Bennett, PLLC (57) ABSTRACT

A transceiver front-end for a communication device comprises a transmit frequency blocking arrangement and a receive frequency blocking arrangement. The transmit frequency blocking arrangement has a blocking frequency interval associated with the transmit frequency and a non-blocking frequency interval associated with the receive frequency, and is configured to block passage of transmit frequency signals between the signal transmission and reception arrangement and the receiver. The receive frequency blocking arrangement has a blocking frequency interval associated with the receive frequency and a non-blocking frequency interval associated with the transmit frequency, and is configured to block passage of receive frequency signals between the signal transmission and reception arrangement and the transmitter. One of the frequency blocking arrangements comprises a network of passive components including at least one transformer and a filter arrangement with a higher impedance at the blocking frequency interval than at the non-blocking frequency interval.

17 Claims, 5 Drawing Sheets

TRANSCEIVER FRONT-END

RELATED APPLICATION

This application claims the benefit under 35 U.S.C. §119 of International Application Number PCT/EP2012/063429 filed on Jul. 9, 2012, the disclosure of which is incorporated herein by reference.

TECHNICAL FIELD

The present invention relates generally to the field of transceiver front-ends for communication devices. More particularly, it relates to transceiver front-ends providing isolation between a transmitter and a receiver.

BACKGROUND

In transceivers for frequency division duplex (FDD) communication (e.g., a transceiver of a cellular radio equipment), the receiver typically experiences strong interference signals from the transmitter of the same transceiver.

The interference signal from the transmitter has a carrier frequency at duplex distance from the carrier frequency of the receive signal. A typical duplex distance is small compared to the carrier frequencies. Typically, the duplex distance may be less than 100 MHz while the carrier frequencies may, for example, be somewhere between 700 MHz and 3 GHz.

To be able to operate with required performance (e.g., achieving good sensitivity), the receiver should preferably be shielded (or isolated) from the interference from the transmitter of the transceiver, both from transmitter signals at transmit frequency and transmitter generated interference at receive frequency. It is also desirable that the transmitter is shielded (or isolated) from the received signals. Example reasons include that as much of the received energy as possible should be transferred to the receiver for optimal receiver performance and that received signals occurring at the transmitter output may cause interference to the signal to be transmitted.

Such isolation is typically achieved by off-chip acoustic wave duplex filters (duplexers). A drawback with duplexers is that they are typically expensive. They are also bulky which increases the size of a transceiver implementation. Duplexers are also fixed in frequency, which necessitates several duplexers to be used if several frequency bands are to be supported. These problems are becoming more pronounced as the number of frequency bands to be supported by a communication device is increased.

Therefore, there is a need for integrated solutions that provide isolation between a transmitter and a receiver.

A typical on-chip isolation implementation is based on cancellation of the interferer signal. To achieve perfect cancellation of transmit signals at the receiver input symmetry is necessary, and the circuit requires a dummy load that equals the antenna impedance both at the receive frequency and at the transmit frequency. If the antenna impedance is complex (inductive or capacitive) and/or varies over time (e.g., due to frequency changes and/or changing antenna surroundings), implementation of a perfect cancellation becomes cumbersome. Furthermore, at least 3 dB of the power of receive and transmit signals will be lost in the dummy load.

US 2011/0064004 A1 discloses an radio frequency (RF) front-end comprising a power amplifier (PA), a noise-matched low-noise amplifier (LNA), a balance network, and a four-port isolation module. The isolation module isolates the third port from the fourth port to prevent strong outbound signals received at the third port from saturating the LNA coupled to the fourth port. Isolation is achieved via electrical balance.

Similarly as described above, a drawback of this solution is that the balance network needs to track impedance changes in the antenna during operation to enable sufficient isolation. The impedance needs to be tracked at both receive frequency and transmit frequency simultaneously. Thus, the implementation is sensitive and complex. A further drawback of this solution is that at least 3 dB of the power of receive and transmit signals will be lost due to the matched impedance of the balance network.

Therefore, there is a need for alternative and improved integrated solutions that provide isolation between a transmitter and a receiver.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved integrated solutions that provide isolation between a transmitter and a receiver.

According to a first aspect, this is achieved by a transceiver front-end of a communication device. The communication device may be a wireless or wired communication device.

According to the first aspect, the transceiver front-end is connectable, at a signal transmission and reception arrangement node, to a signal transmission and reception arrangement adapted to transmit a transmit signal having a transmit frequency and to receive a receive signal having a receive frequency. Examples of signal transmission and reception arrangements include an antenna, a group of antennas, and a cable. The transceiver front-end is also connectable, at one or more transmitter nodes, to a transmitter adapted to produce the transmit signal, and, at one or more receiver nodes, to a receiver adapted to process the receive signal.

The transceiver front-end comprises a transmit frequency blocking arrangement connected to the signal transmission and reception arrangement node and at least one of the receiver nodes. The transmit frequency blocking arrangement has a blocking frequency interval associated with the transmit frequency and a non-blocking frequency interval associated with the receive frequency, and is adapted to block passage of transmit frequency signals between the signal transmission and reception arrangement and the receiver. The transmit frequency may be comprised in the blocking frequency interval and the receive frequency may be comprised in the non-blocking frequency interval.

The transceiver front-end also comprises a receive frequency blocking arrangement connected to the signal transmission and reception arrangement node and at least one of the transmitter nodes. The receive frequency blocking arrangement has a blocking frequency interval associated with the receive frequency and a non-blocking frequency interval associated with the transmit frequency, and is adapted to block passage of receive frequency signals between the signal transmission and reception arrangement and the transmitter. The receive frequency may be comprised in the blocking frequency interval and the transmit frequency may be comprised in the non-blocking frequency interval.

Thus, the transmitter is connectable to the signal transmission and reception arrangement node via the receive frequency blocking arrangement and the receiver is connectable to the signal transmission and reception arrangement node via the transmit frequency blocking arrangement.

The transmit frequency blocking arrangement comprises a network of passive components comprising at least one transformer and a first filter arrangement adapted to have a higher impedance value at the transmit frequency than at the receive frequency.

The receive frequency blocking arrangement comprises a second filter arrangement adapted to have a higher impedance value at the transmit frequency than at the receive frequency and a third filter arrangement adapted to have a higher impedance value at the receive frequency than at the transmit frequency.

In some embodiments, each of the first, second, and third filter arrangements comprises a first inductance connected in parallel with a first capacitance to form a blocking frequency resonance arrangement.

The first inductance may be a part of the transformer according to some embodiments. In other embodiments, the first inductance comprises a separate inductance.

The filter arrangements may further comprise at least one of a second inductance and a second capacitance connected in series with the blocking frequency resonance arrangement to form a non-blocking frequency resonance arrangement.

If the filter arrangement is a low pass filter arrangement, the filter arrangement may comprise the second capacitance. If the filter arrangement is a high pass filter arrangement, the filter arrangement may comprise the second inductance. In some embodiments, a filter arrangement does not necessarily comprise any of the second inductance and the second capacitance as will be explained later.

According to some embodiments, the signal transmission and reception arrangement node may be connected to a first node of the third filter arrangement, a first node of the one or more transmitter nodes may be connected to a second node of the third filter arrangement and to a first node of the second filter arrangement, and a second node of the second filter arrangement may be connected to a second node of a first side of the transformer of the transmit frequency blocking arrangement.

Further, the signal transmission and reception arrangement node may be connected to a first node of a first side of the transformer of the transmit frequency blocking arrangement, the first filter arrangement may be connected to the second node of the first side of the transformer of the transmit frequency blocking arrangement, and a first node of the one or more receiver nodes may be connected to a first node of the second side of the transformer of the transmit frequency blocking arrangement.

The transmit frequency blocking arrangement may further comprise a fourth filter arrangement connected to a second node of the second side of the transformer of the transmit frequency blocking arrangement. Alternatively, the second node of the second side of the transformer of the transmit frequency blocking arrangement may be connected to a second node of the one or more receiver nodes.

In some embodiments, the network of passive components further comprises a coupler connected between the first side of the transformer and the second side of the transformer and adapted to cancel a remaining signal at the blocking frequency interval.

In some embodiments the coupler is connected between the first node of the first side of the transformer and the first node of the second side of the transformer.

In some embodiments the coupler is connected between the second node of the first side of the transformer and the second node of the second side of the transformer.

The coupler may comprise one or more resistances connected between the first node of the first side of the transformer and the first node of the second side of the transformer. For example, the coupler may comprise first and second resistances connected in series between the first node of the first side of the transformer and the first node of the second side of the transformer via a mid point node. The coupler may also comprise a third capacitance connected between the mid point node and ground. The first and second resistances may or may not be matched. In some embodiments, the coupler comprises a third inductance connected between the mid point node and ground (e.g., in parallel with the third capacitance if present). The third capacitance and the third inductance provides for a possibility to tune the phase of the coupling between the transformer sides so that the remaining signal is properly canceled.

To enable the coupler to cancel the remaining signal the first side of the transformer may be adapted to have an opposite phase compared to the second side of the transformer.

According to some embodiments, the transmit frequency blocking arrangement comprises first and second transformers. In some embodiments, the network of passive components comprises separate first and second transformers. In other embodiments, the network of passive components may comprise a single transformer unit and the first and second transformers are first and second parts of the single transformer unit.

The signal transmission and reception arrangement node may be connected to a first node of a first side of the first transformer, a first node of the one or more receiver nodes may be connected to a first node of a second side of the first transformer and a second node of the first side of the first transformer may be connected to a first node of a first side of the second transformer. The first filter arrangement may be connected to a second node of the first side of the second transformer. A second node of the second side of the first transformer may be connected to a fourth filter arrangement, a first node of a second side of the second transformer may be connected to a fifth filter arrangement, and a second node of the second side of the second transformer may be connected to a second node of the one or more receiver nodes.

In some embodiments, a sixth filter arrangement, adapted to have a higher impedance value at the receive frequency than at the transmit frequency, may be connected between the first and second nodes of the one or more receiver nodes.

A second aspect is another transceiver front-end of a communication device. The communication device may be a wireless or wired communication device.

As for the first aspect, the transceiver front-end is connectable, at a signal transmission and reception arrangement node, to a signal transmission and reception arrangement adapted to transmit a transmit signal having a transmit frequency and to receive a receive signal having a receive frequency. The transceiver front-end is also connectable, at one or more transmitter nodes, to a transmitter adapted to produce the transmit signal, and, at one or more receiver nodes, to a receiver adapted to process the receive signal.

The transceiver front-end comprises a transmit frequency blocking arrangement connected to the signal transmission and reception arrangement node and at least one of the receiver nodes. The transmit frequency blocking arrangement has a blocking frequency interval associated with the transmit frequency and a non-blocking frequency interval associated with the receive frequency, and is adapted to block passage of transmit frequency signals between the signal transmission and reception arrangement and the receiver. The transmit frequency may be comprised in the blocking frequency interval and the receive frequency may be comprised in the non-blocking frequency interval.

The transceiver front-end also comprises a receive frequency blocking arrangement connected to the signal transmission and reception arrangement node and at least one of the transmitter nodes. The receive frequency blocking arrangement has a blocking frequency interval associated with the receive frequency and a non-blocking frequency interval associated with the transmit frequency, and is adapted to block passage of receive frequency signals between the signal transmission and reception arrangement and the transmitter. The receive frequency may be comprised in the blocking frequency interval and the transmit frequency may be comprised in the non-blocking frequency interval.

The receive frequency blocking arrangement comprises a network of passive components comprising at least one transformer and a first filter arrangement adapted to have a higher impedance value at the receive frequency than at the transmit frequency.

The transmit frequency blocking arrangement comprises a second filter arrangement adapted to have a higher impedance value at the receive frequency than at the transmit frequency and a third filter arrangement adapted to have a higher impedance value at the transmit frequency than at the receive frequency.

In some embodiments, the second aspect may additionally have features identical with or corresponding to any of the various features as explained above for the first aspect.

A third aspect is a transceiver comprising the transceiver front-end of the first or second aspect, the transmitter and the receiver. The transceiver may further comprise the signal transmission and reception arrangement.

A fourth aspect is a (wireless or wired) communication device comprising the transceiver of the third aspect.

According to a fifth aspect, a method is provided of blocking transmit frequency signals from passage between a signal transmission and reception arrangement and a receiver of a communication device.

The method comprises constructing a first filter arrangement comprising a first inductance connected in parallel with a first capacitance to form a blocking frequency resonance arrangement, and at least one of a second inductance and a second capacitance connected in series with the blocking frequency resonance arrangement to form a non-blocking frequency resonance arrangement, wherein the first filter arrangement has a higher impedance value at the transmit frequency than at the receive frequency.

The method also comprises connecting the signal transmission and reception arrangement to a first node of a first side of a transformer and the receiver to a first node of a second side of the transformer, and connecting the first filter arrangement to a second node of the first side of the transformer.

In some embodiments, the method further provides blocking of receive frequency signals from passage between a signal transmission and reception arrangement and a transmitter of a communication device.

In such embodiments, the method comprises constructing a second filter arrangement comprising a third inductance connected in parallel with a third capacitance to form a blocking frequency resonance arrangement, and at least one of a fourth inductance and a fourth capacitance connected in series with the blocking frequency resonance arrangement to form a non-blocking frequency resonance arrangement, wherein the second filter arrangement has a higher impedance value at the transmit frequency than at the receive frequency.

In these embodiments, the method also comprises constructing a third filter arrangement comprising a fifth inductance connected in parallel with a fifth capacitance to form a blocking frequency resonance arrangement, and at least one of a sixth inductance and a sixth capacitance connected in series with the blocking frequency resonance arrangement to form a non-blocking frequency resonance arrangement, wherein the third filter arrangement has a higher impedance value at the receive frequency than at the transmit frequency.

When the second and third filter arrangements have been constructed, the method may comprise connecting the signal transmission and reception arrangement node to a first node of the third filter arrangement, connecting the transmitter to a second node of the third filter arrangement and to a first node of the second filter arrangement, and connecting a second node of the second filter arrangement to the second node of the first side of the transformer.

In some embodiments, the third, fourth and fifth aspects may additionally have features identical with or corresponding to any of the various features as explained above for the first and/or second aspects.

An advantage of some embodiments is that a possibility to implement an integrated solution for isolation between a transmitter and a receiver is provided.

Another advantage of some embodiments is that power loss due to a dummy load is avoided.

A further advantage with some embodiments is that matching of a dummy load to antenna impedance is avoided.

Yet a further advantage with some embodiments is that tracking of changing antenna impedance is not necessary.

Some embodiments provide solutions for isolation between a transmitter and a receiver that are simple and area efficient (e.g., one transformer and three or more filter arrangements). Furthermore, the solutions according to some embodiments provide isolation while having low power consumption.

The isolation solutions provided by some embodiments are easily tunable due to the variable filter arrangements. In some embodiments, the tuning is achieved by variable capacitors of the filter arrangements.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where transceiver structures are provided comprising a receiver, a transmitter, a signal transmission and reception arrangement (e.g., an antenna), a transmit frequency blocking arrangement and a receive frequency blocking arrangement.

The transmitter is connectable to the signal transmission and reception arrangement node via the receive frequency blocking arrangement and the receiver is connectable to the signal transmission and reception arrangement node via the transmit frequency blocking arrangement.

The transmit frequency blocking arrangement is adapted to block passage of transmit frequency signals between the signal transmission and reception arrangement and the receiver.

Blocking of transmit frequency signals may be achieved by the transmit frequency blocking arrangement having a blocking frequency interval associated with the transmit frequency and a non-blocking frequency interval associated with the receive frequency. The blocking frequency interval may be a frequency interval comprising the transmit frequency and the non-blocking frequency interval may be a frequency interval comprising the receive frequency. The frequency intervals may, for example, be broad band or narrow band. The frequency intervals may, for example, comprise all frequencies below a cut-off frequency or all frequencies of interest above a cut-off frequency. Typically, one of the frequency intervals is a low frequency interval and the other frequency interval is a high frequency interval.

Similarly, the receive frequency blocking arrangement is adapted to block passage of receive frequency signals between the signal transmission and reception arrangement and the transmitter.

Blocking of receive frequency signals may be achieved by the receive frequency blocking arrangement having a blocking frequency interval associated with the receive frequency and a non-blocking frequency interval associated with the transmit frequency. The blocking frequency interval may be a frequency interval comprising the receive frequency and the non-blocking frequency interval may be a frequency interval comprising the transmit frequency. The frequency intervals may, for example, be broad band or narrow band. The frequency intervals may, for example, comprise all frequencies below a cut-off frequency or all frequencies of interest above a cut-off frequency. Typically, one of the frequency intervals (opposite to the choice for transmit frequency blocking) is a low frequency interval and the other frequency interval is a high frequency interval.

Embodiments described herein provide an isolator/duplexer between a transmitter and a receiver. The isolator comprises the transmit frequency blocking arrangement and the receive frequency blocking arrangement.

For some embodiments presented herein one of the blocking arrangements comprises at least one transformer with one or more filter arrangements at the ground terminal(s). The transformer(s) may or may not have a cancellation path between the primary and secondary windings. Such a transformer arrangement can pass a signal at a frequency where the filter arrangement is low ohmic and attenuate a signal at another frequency where the filter arrangement is high ohmic.

In a typical implementation, the transmit frequency blocking arrangement has the described structure with a transformer and one or more filter arrangements and the receive frequency blocking arrangement comprises two filter arrangements.

Thus, the blocking arrangements comprise one or more filter arrangements. The filter arrangements are constructed to have pass (non-blocking) and blocking frequency ranges associated with the receive frequency or the transmit frequencies respectively. Each filter arrangement is typically a low pass filter arrangement or a high pass filter arrangement, where the respective cut-off frequency has a value between the receive frequency and the transmit frequency.

In the typical implementation exemplified above, the filter arrangement(s) of the transmit frequency blocking arrangement may have a blocking frequency interval comprising the transmit frequency and a non-blocking frequency interval comprising the receive frequency. One of the two filter arrangements of the receive frequency blocking arrangement may be a filter arrangement connected between the transmitter node and the antenna node and having a blocking frequency interval comprising the receive frequency and a non-blocking frequency interval comprising the transmit frequency. The other of the two filter arrangements may be a filter arrangement connected between the transmitter node and the transformer of the transmit frequency blocking arrangement and having a blocking frequency interval comprising the transmit frequency and a non-blocking frequency interval comprising the receive frequency.

The filter arrangements (and thereby the isolator) are tunable by way of variable component values. The possibility to tune the filter arrangements to any desirable frequency provides for a possibility to have an integrated (on-chip) implementation of narrowband (high Q-value) filters, and a single (or very few) implementation may suffice for covering all relevant frequencies.

Even though many embodiments herein are particularly suitable for integrated implementation, the isolator may equivalently be implemented—partly or fully—off-chip (e.g., using discrete components).

Figure 1:
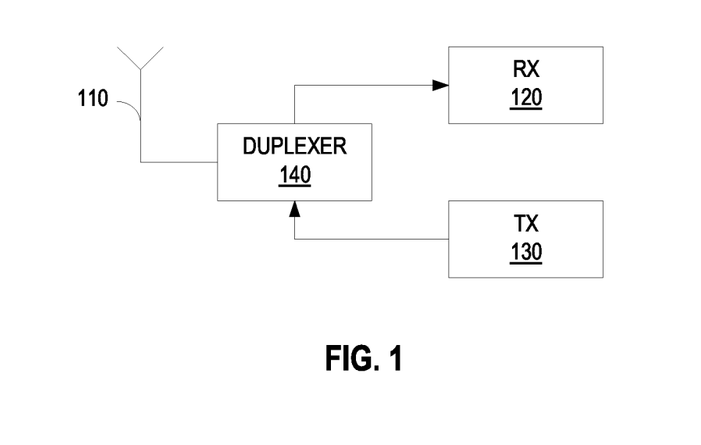
FIG. 1 is a schematic drawing illustrating a prior art transceiver arrangement.

FIG. 1 illustrates a typical transceiver arrangement according to the prior art. The typical transceiver comprises a receiver (RX) 120, a transmitter (TX) 130, an antenna 110 and a duplexer 140 implemented as a separate module. The duplexer provides isolation between the transmitter and the receiver. As mentioned before, such a duplexer implementation is typically expensive and large.

Figure 2:
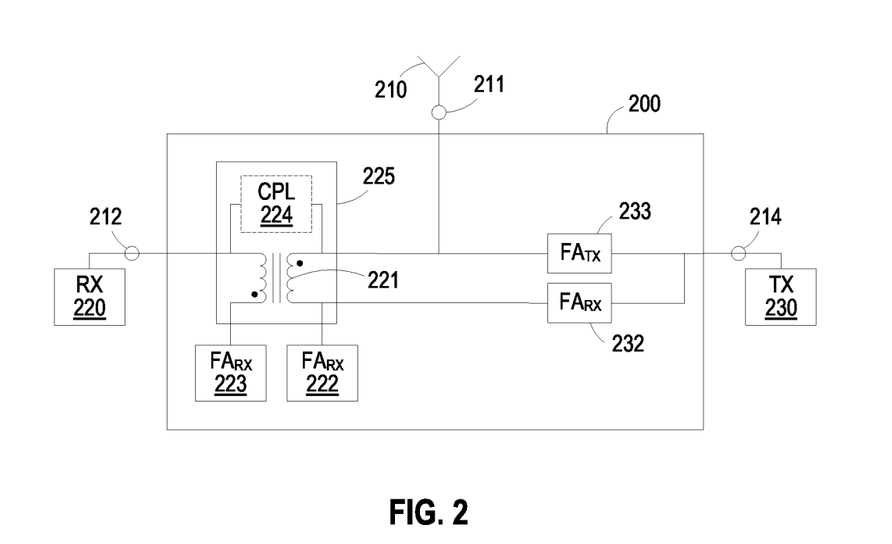
FIG. 2 is a schematic drawing illustrating an example transceiver arrangement according to some embodiments.

FIG. 2 illustrates an example of an alternative transceiver arrangement according to some embodiments. The transceiver arrangement of FIG. 2 comprises a receiver (RX) 220, a transmitter (TX) 230, an antenna 210 and a transceiver front-end 200. The antenna is connected to an antenna node 211 of the transceiver front-end, the transmitter is connected to a transmitter node 214 of the transceiver front-end, and the receiver is connected to a receiver node 212 of the transceiver front-end. In some embodiments, the transmitter and/or the receiver may be connected to two nodes of the transceiver front-end (i.e., differential receiver input and/or differential transmitter output).

The transceiver front-end 200 comprises a transmit frequency blocking arrangement and a receive frequency blocking arrangement.

The transmit frequency blocking arrangement comprises a network of passive components 225 comprising at least one transformer 221. In this example, the network of passive components may consist of the transformer 221 only, or of the transformer 221 and a coupler (CPL) 224 connected between first nodes of the first and second side of the transformer. The first and second side of the transformer may have opposite phase as illustrated in FIG. 2 or they may have the same phase. In other examples, more components may be present.

The function of the coupler 224 is to cancel remaining signals at the unwanted frequency (i.e., signals not fully cancelled by the filter arrangements, for example due to tuning problems). The coupler 224 will be further described later in connection to FIG. 7.

The transmit frequency blocking arrangement also comprises at least one filter arrangement (FARX) 222, 223 adapted to have a higher impedance value in a transmit frequency blocking interval (e.g., a frequency interval comprising the transmit frequency) than in a receive frequency non-blocking interval (e.g., a frequency interval comprising the receive frequency). The filter arrangements (FARX) 222, 223 may be a low pass filter arrangement if the receive frequency is lower than the transmit frequency and may be a high pass filter arrangement otherwise.

The receive frequency blocking arrangement comprises at least two filter arrangements (FARX, FATX) 232, 233. The filter arrangement 233 is adapted to have a higher impedance value in a receive frequency blocking interval (e.g., a frequency interval comprising the receive frequency) than in a transmit frequency non-blocking interval (e.g., a frequency interval comprising the transmit frequency). The filter arrangement 232 is adapted to have a higher impedance value in a transmit frequency blocking interval (e.g., a frequency interval comprising the transmit frequency) than in a receive frequency non-blocking interval (e.g., a frequency interval comprising the receive frequency). The filter arrangement (FATX) 233 may be a high pass filter arrangement if the receive frequency is lower than the transmit frequency and may be a low pass filter arrangement otherwise. The filter arrangement (FARX) 232 may be a low pass filter arrangement if the receive frequency is lower than the transmit frequency and may be a high pass filter arrangement otherwise.

Typically, a high impedance value may comprise a value that is higher than the antenna impedance.

The signal transmission and reception arrangement node 211 is connected to a first node of a first side of the transformer 221 of the transmit frequency blocking arrangement and to a first node of the filter arrangement 233 of the receive frequency blocking arrangement.

The filter arrangement 222 is connected to a second node of the first side of the transformer 221, and the filter arrangement 223 is connected to a second node of the second side of the transformer 221. Various implementations may employ one or more of the FAs 222, 223. In the example shown in FIG. 2, the FA 223 connected to the second node of the second side of the respective transformer may be designed to be identical to the FA 222 connected to the second node of the first side of the transformer. Alternatively, they may be tuned differently to compensate for imperfections, e.g., in the transformer.

The transmitter node 214 is connected to a second node of the filter arrangement 233 of the receive frequency blocking arrangement, and the receiver node 212 is connected to the first node of the second side of the transformer of the transmit frequency blocking arrangement.

The transmitter node 214 is also connected to a second node of the filter arrangement 232 of the receive frequency blocking arrangement. A first node of the filter arrangement 232 of the receive frequency blocking arrangement is connected to the second node of the first side of the transformer 221 of the transmit frequency blocking arrangement.

Figure 3A:
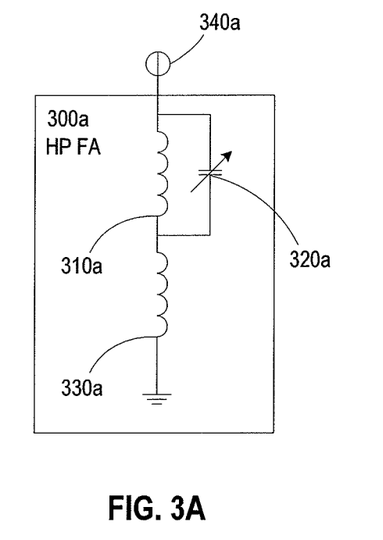
FIGS. 3a and 3b are schematic drawings illustrating two different examples of filter arrangements according to some embodiments.
Figure 3B:
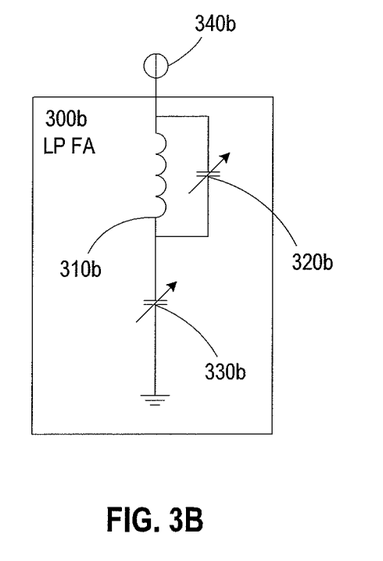

The filter arrangements (FARX) 222, 223 and 232 are typically of the same type (e.g., either a structure as described in FIG. 3a or a structure as described in FIG. 3b). The filter arrangements 222 and 223 are typically close to identical as described above.

The filter arrangement 232 may differ in impedance value from the filter arrangements 222 and 223. The impedance levels may be scaled when designing the transceiver (and/or during production) so that transmit frequency signals as well as receive frequency noise form the transmitter appear as common-mode around the first side of the transformer. For example, the impedance levels may be set to achieve the same magnitude and phase on both sides of the transformer. Typically, the transformer coupling at transmit frequency is poor due to the presence of 232. The remaining unwanted transmission signal may be by tuning the impedance values of 222 and 232. A similar impedance setting may be carried out for receive frequency signals.

As mentioned before the receiver may have a differential structure. Then, a second receiver node is connected to the second node of the second side of the transformer of the transmit frequency blocking arrangement. In such an embodiment, the filter arrangement 223 is optional.

FIG. 2 shows a typical implementation of a transceiver front-end according to some embodiments. In other implementations, the receive frequency blocking arrangement may comprise a network of passive components (comprising at least one transformer) and at least one filter arrangement adapted to have a higher impedance value in a receive frequency blocking interval than in a transmit frequency non-blocking interval. Then, the transmit frequency blocking arrangement may comprise at least two filter arrangements, one adapted to have a higher impedance value in a transmit frequency blocking interval than in a receive frequency non-blocking interval and the other adapted to have a higher impedance value in a receive frequency blocking interval than in a transmit frequency non-blocking interval.

FIGS. 3a and 3b illustrate two examples of filter arrangements according to some embodiments. FIG. 3a illustrates a high pass filter arrangement (HP FA) 300a and FIG. 3b illustrates a low pass filter arrangement (LP FA) 300b.

In this context, the term high pass filter includes the case where the filter impedance characteristic has a peak at a first frequency and a notch at a second frequency (where the second frequency is higher than the first frequency), and the term low pass filter includes the case where the filter impedance characteristic has a notch at a first frequency and a peak at a second frequency (where the second frequency is higher than the first frequency).

In this example, the FA 300a comprises a connection node 340a, a first inductance 310a and a first capacitance 320a connected in parallel to the connection node 340a, and forming a blocking frequency resonance arrangement. The FA 300a also comprises a second inductance 330a connected in series with the parallel arrangement to ground, and forming a non-blocking (pass) frequency resonance arrangement with the first capacitance. The pass frequency range of the FA 300a (i.e., where the impedance of the FA is low) comprises frequencies above a cut-off frequency and the blocking frequency range of the FA 300a (i.e., where the impedance of the FA is high) comprises frequencies below the cut-off frequency. Typically the FA 300a may be constructed and tuned so that the cut-off frequency is between the transmit frequency and the receive frequency.

The example FA 300b comprises a connection node 340a, a first inductance 310a and a first capacitance 320a connected in parallel to the connection node 340a, and forming a blocking frequency resonance arrangement. The FA 300b also comprises a second capacitance 330b connected in series with the parallel arrangement to ground, and forming a non-blocking (pass) frequency resonance arrangement with the first inductance. The pass frequency range of the FA 300b (i.e., where the impedance of the FA is low) comprises frequencies below a cut-off frequency and the blocking frequency range of the FA 300b (i.e., where the impedance of the FA is high) comprises frequencies above the cut-off frequency. Typically the FA 300b may be constructed and tuned so that the cut-off frequency is between the transmit frequency and the receive frequency.

Each of the capacitors 320a, 320b, 330b can for example be selected to comprise one capacitance with a high value providing for a possibility to tune the filter arrangement to a frequency range (e.g., the filter bandwidth) of the filter arrangement and one capacitance with a low value providing for a possibility to tune the filter arrangement to a frequency band of interest. The capacitor may additionally comprise a bank of smaller capacitances to provide coverage of the full bandwidth of each frequency bands.

The capacitor 320a may typically be tuned to form a blocking frequency resonance arrangement with the inductance 310a and to form a non-blocking frequency resonance arrangement with the inductance 330a. The capacitor 320b may typically be tuned to form a blocking frequency resonance arrangement with the inductance 310b and the capacitance 330b may typically be tuned to form a non-blocking frequency resonance arrangement with the inductance 310b.

The filter arrangements may, for example, be implemented on chip, on high-Q substrate or as discrete components on a printed circuit board (PCB).

Any of the filter arrangements illustrated in FIGS. 3a and 3b are suitable to use, for example, as the filter arrangements 222 and 223 of FIG. 2. The filter arrangements illustrated in FIGS. 3a and 3b may also be used as the filter arrangements 232 and 233 of FIG. 2 if the ground node of FIGS. 3a and 3b is replaced by a second connection node.

Returning to FIG. 2 and assuming that the receive frequency is higher than the transmit frequency, a HP FA construction (e.g., 300a) may be used for the FARX 222, 223 and 232 and a LP FA construction (e.g., 300b) may be used for the FATX 233.

At transmit frequency, the FARX 222 and 223 have high impedance. Thus, no (or very limited) transmit frequency current will flow in the transformer 221, and the receiver is isolated from transmit signal leakage from the transmitter and/or the antenna. Furthermore, the FARX 232 also has high impedance preventing transmit frequency signals to take that path from the transmitter, and the FATX 233 has low impedance providing a path for transmit frequency signals from the transmitter to the antenna.

At receive frequency though, the FARX 222 and 223 have low impedance. Thus, receive frequency current will flow freely in the transformer 221, and the received signal is transformed to the receiver from the antenna. Furthermore, the FARX 232 also has low impedance leading receive frequency noise from the transmitter to ground via 232 and 222, without passing the transformer 221 (and hence without transferring the noise to the receiver). The FATX 233 has high impedance hindering receive frequency signals from the antenna to leak into the transmitter. Likewise, receive frequency interference generated by the transmitter will not reach the antenna.

Looking into the circuit from the antenna node 211, the impedance at transmit frequency is low on the transmitter side and transmit frequency signals are led from the transmitter to the antenna. On the other hand, looking into the circuit from the antenna node 211, the impedance at receive frequency is low on the receiver side and the receiver transformer 221 is coupling receive frequency signals from the antenna to the receiver.

In some embodiments, the second inductance 330a of the filter arrangement in FIG. 3a may be removed. For example, if two similar filter arrangements are located at respective sides of a transformer and there exists at least a small coupling between their first inductances, the second inductances may be omitted.

In some embodiments, the first inductance 310a, 310b of the filter arrangements in FIGS. 3a and 3b may be achieved by (partly or fully) utilizing the transformer windings or by letting a coupling (mutual inductance) between the first inductances of the filter arrangements comprise part of the transformer. The latter is an alternative way to implement the coupler function.

Figure 4:
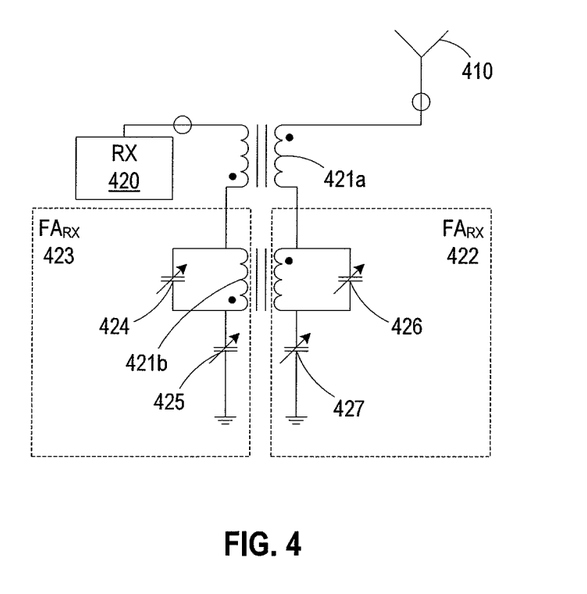
FIG. 4 is a schematic drawing illustrating an example transmit frequency blocking arrangement according to some embodiments.

FIG. 4 illustrates such an example in a transmit frequency blocking arrangement according to some embodiments. The arrangement of FIG. 4 comprises a receiver (RX) 420, an antenna 410 and a transmit frequency blocking arrangement.

The transmit frequency blocking arrangement comprises a transformer having a first part 421a and a second part 421b. The first and second parts may be implemented as a single transformer or the second part may comprise two separate inductances experiencing a coupling (mutual inductance). The first and second side of the transformer may have opposite phase as illustrated in FIG. 4 or they may have the same phase.

The signal transmission and reception arrangement 410 is connected to a first node of a first side of the first part 421a of the transformer. The receiver 420 is connected to a first node of the second side of the first part 421a of the transformer. The second nodes of the first part 421a of the transformer are connected to respective first nodes of the second part 421b of the transformer.

The transmit frequency blocking arrangement also comprises two filter arrangements (FARX) 422, 423, each with a similar structure as described in connection with FIG. 3b (i.e., first 424, 426 and second 425, 427 capacitances and first inductances). The first inductances of the filter arrangements consist of respective windings of the second part 421b of the transformer.

If the coupling of the second part of the transformer should be stronger than needed for sufficient cancellation of the remaining unwanted signal, it is possible to restore isolation by fine-tuning the second capacitances 425, 427 in opposite directions.

A similar construction as shown in FIG. 4 (i.e., using a mutual inductance between the first inductances) is possible using a FA structure as described in connection with FIG. 3a when applicable. If the coupling of the second part of the transformer should be stronger than needed for sufficient cancellation of the remaining unwanted signal in that case, it is possible to restore isolation by fine-tuning the first capacitances in opposite directions.

Naturally, the similar constructions as the ones described in connection to FIG. 4 for a receive frequency blocking arrangement may be equally applicable in a transmit frequency blocking arrangement according to some embodiments.

Figure 5:
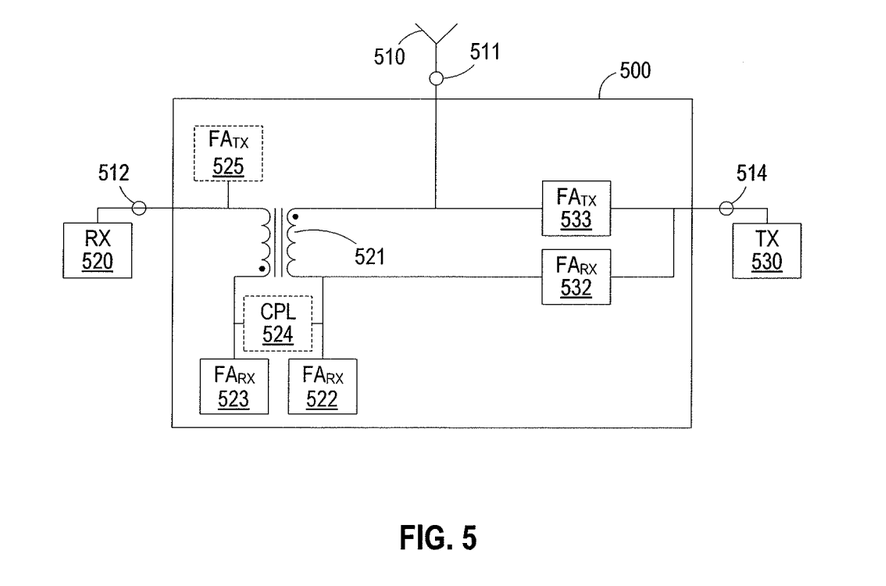
FIG. 5 is a schematic drawing illustrating an example transceiver arrangement according to some embodiments.

FIG. 5 illustrates an example of an alternative transceiver arrangement according to some embodiments. The transceiver arrangement of FIG. 5 comprises a receiver (RX) 520, a transmitter (TX) 530, an antenna 510 and a transceiver front-end 500. The antenna is connected to an antenna node 511 of the transceiver front-end, the transmitter is connected to a transmitter node 514 of the transceiver front-end, and the receiver is connected to a receiver node 512 of the transceiver front-end (i.e., the receiver has non-differential (single-ended input). In some embodiments, the receiver may be connected to two nodes of the transceiver front-end (i.e., differential receiver input).

The transceiver front-end 500 comprises a transmit frequency blocking arrangement and a receive frequency blocking arrangement.

The transmit frequency blocking arrangement comprises a transformer 521. In this example, the network of passive components may consist of the transformer 521 only, or of the transformer 521 and a coupler (CPL) 524 connected between second nodes of the first and second side of the transformer. The first and second side of the transformer may have opposite phase as illustrated in FIG. 5 or they may have the same phase. The coupler may provide for further tuning of the transmission frequency blocking and/or the receive frequency noise reduction.

The transmit frequency blocking arrangement also comprises two filter arrangements (FARX) 522, 523 adapted to have a higher impedance value in a transmit frequency blocking interval (e.g., a frequency interval comprising the transmit frequency) than in a receive frequency non-blocking interval (e.g., a frequency interval comprising the receive frequency). The filter arrangements (FARX) 522, 523 may be a low pass filter arrangement if the receive frequency is lower than the transmit frequency and may be a high pass filter arrangement otherwise.

The receive frequency blocking arrangement comprises at least two filter arrangements (FARX, FATX) 532, 533. The filter arrangement 533 is adapted to have a higher impedance value in a receive frequency blocking interval than in a transmit frequency non-blocking interval. The filter arrangement 532 is adapted to have a higher impedance value in a transmit frequency blocking interval than in a receive frequency non-blocking interval. The filter arrangement (FATX) 533 may be a high pass filter arrangement if the receive frequency is lower than the transmit frequency and may be a low pass filter arrangement otherwise. The filter arrangement (FARX) 532 may be a low pass filter arrangement if the receive frequency is lower than the transmit frequency and may be a high pass filter arrangement otherwise.

The signal transmission and reception arrangement node 511 is connected to a first node of a first side of the transformer 521 of the transmit frequency blocking arrangement and to a first node of the filter arrangement 533 of the receive frequency blocking arrangement.

The filter arrangement 522 is connected to a second node of the first side of the transformer 521, and the filter arrangement 523 is connected to a second node of the second side of the transformer 521.

The transmitter node 514 is connected to a second node of the filter arrangement 533 of the receive frequency blocking arrangement, and the receiver node 512 is connected to the first node of the second side of the transformer of the transmit frequency blocking arrangement.

The transmitter node 514 is also connected to a second node of the filter arrangement 532 of the receive frequency blocking arrangement. A first node of the filter arrangement 532 of the receive frequency blocking arrangement is connected to the second node of the first side of the transformer 521 of the transmit frequency blocking arrangement.

The transmit frequency blocking arrangement may optionally comprise an additional filter arrangement (FATX) 525 adapted to have a higher impedance value in a receive frequency blocking interval than in a transmit frequency non-blocking interval. The filter arrangement 525 may be connected to the first node of the second side of the transformer 521.

The optional filter arrangement 525 provide for a further reduction of the transmit frequency signals at the receiver input. A drawback is that an insertion loss for receive frequency signals will be experienced.

Figure 6:
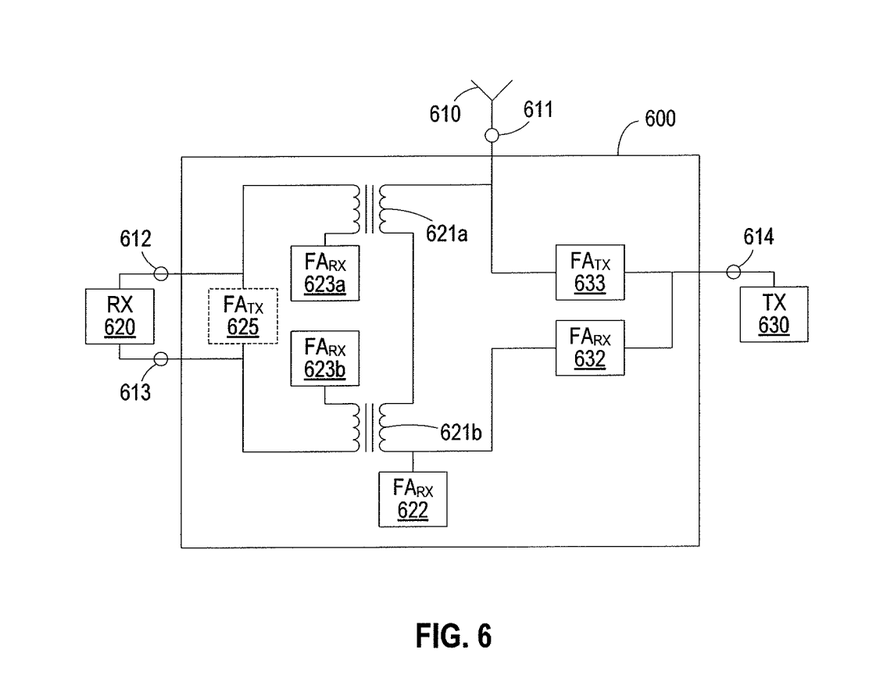
FIG. 6 is a schematic drawing illustrating an example transceiver arrangement according to some embodiments.

FIG. 6 illustrates yet an example of an alternative transceiver arrangement according to some embodiments. The transceiver arrangement of FIG. 6 comprises a receiver (RX) 620, a transmitter (TX) 630, an antenna 610 and a transceiver front-end 600. The antenna is connected to an antenna node 611 of the transceiver front-end, the transmitter is connected to a transmitter node 614 of the transceiver front-end, and the receiver is connected to two receiver nodes 612, 613 of the transceiver front-end (i.e., the receiver has differential input).

The transceiver front-end 600 comprises a transmit frequency blocking arrangement and a receive frequency blocking arrangement.

The transmit frequency blocking arrangement comprises first and second transformers 621a and 621b respectively. In this example, the first and second sides of the transformers have the same phase and no coupler is present.

The transmit frequency blocking arrangement also comprises a filter arrangement (FARX) 622 adapted to have a higher impedance value in a transmit frequency blocking interval (e.g., a frequency interval comprising the transmit frequency) than in a receive frequency non-blocking interval (e.g., a frequency interval comprising the receive frequency). The filter arrangement 622 may be a low pass filter arrangement if the receive frequency is lower than the transmit frequency and may be a high pass filter arrangement otherwise.

The signal transmission and reception arrangement node 611 is connected to a first node of a first side of the first transformer 621a of the transmit frequency blocking arrangement. The second node of the first side of the first transformer 621a is connected to the first node of the first side of the second transformer 621b. The filter arrangement 622 is connected to a second node of the first side of the second transformer 621b.

The receiver nodes 612, 613 are respectively connected to the first node of the second side of the first transformer and the second node of the second side of the second transformer.

The transmit frequency blocking arrangement also comprises two other filter arrangements (FARX) 623a, 623b adapted to have a higher impedance value in a transmit frequency blocking interval than in a receive frequency non-blocking interval. They are respectively connected to the second node of the second side of the first transformer and the first node of the second side of the second transformer.

Optionally, the transmit frequency blocking arrangement may also comprise a filter arrangement (FATX) 625 adapted to have a lower impedance value in a transmit frequency interval than in a receive frequency interval. It may be connected between the first node of the second side of the first transformer and the second node of the second side of the second transformer. The optional filter arrangement 625 provide for a further reduction of the transmit frequency signals at the receiver input. A drawback is that an insertion loss for receive frequency signals will be experienced.

The receive frequency blocking arrangement comprises at least two filter arrangements (FARX, FATX) 632, 633. The filter arrangement 633 is adapted to have a higher impedance value in a receive frequency blocking interval than in a transmit frequency non-blocking interval. The filter arrangement 632 is adapted to have a higher impedance value in a transmit frequency blocking interval than in a receive frequency non-blocking interval. The filter arrangement (FATX) 633 may be a high pass filter arrangement if the receive frequency is lower than the transmit frequency and may be a low pass filter arrangement otherwise. The filter arrangement (FARX) 632 may be a low pass filter arrangement if the receive frequency is lower than the transmit frequency and may be a high pass filter arrangement otherwise.

The signal transmission and reception arrangement node 611 is connected to a first node of the filter arrangement 633 of the receive frequency blocking arrangement.

The transmitter node 614 is connected to a second node of the filter arrangement 633 of the receive frequency blocking arrangement.

The transmitter node 614 is also connected to a second node of the filter arrangement 632 of the receive frequency blocking arrangement. A first node of the filter arrangement 562 of the receive frequency blocking arrangement is connected to the second node of the first side of the second transformer 621b of the transmit frequency blocking arrangement.

The structures described herein for transmit frequency blocking arrangements may be equally applicable for receive frequency blocking arrangements (and vice versa).

Figure 7:
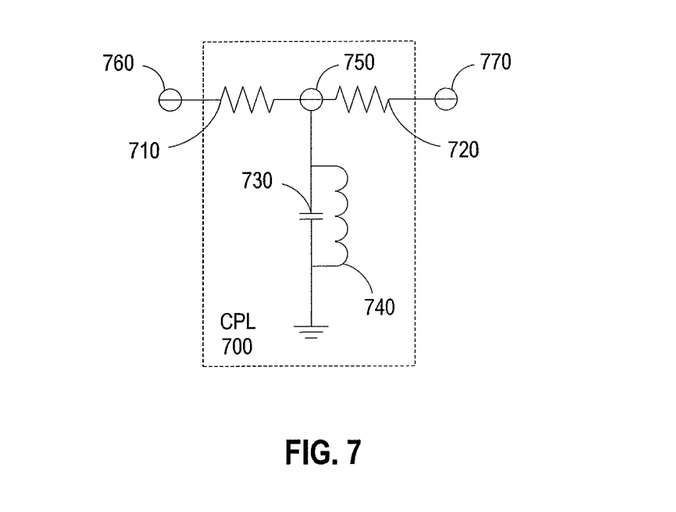
FIG. 7 is a schematic drawing illustrating an example coupler according to some embodiments.

FIG. 7 illustrates one example implementation of a coupler (see e.g., FIGS. 2 and 5). A coupler may be appended between the windings of a transformer when the transformer sides are of opposite phase (i.e., the signal becomes differential over the coupler). For example, the coupler may be connected at a first node of the first side of the transformer and at a first node of the second side of the transformer. In another example, the coupler may be connected at a second node of the first side of the transformer and at a second node of the second side of the transformer.

The function of the coupler is to cancel any remaining signal at an unwanted frequency (e.g., transmit frequency for transmit frequency blocking arrangement). Thus, any signal at the unwanted frequency that is still present over the transformer should be tracked and cancelled by feedback of a portion of the signal from the one side of the transformer to the other side of the transformer and by the transformer sides having opposite phase.

Typically, the fraction of the unwanted signal fed between the windings of the transformer should equal the fraction of the unwanted signal attenuated in the filter arrangement (i.e., amplitudes should be matched). Thus, adding the two signal paths (the one via the coupler and the one through the filter arrangement and transformer) the unwanted signal is cancelled. The optimization of this solution may be limited by the tuning capability of the circuit and by the bandwidth of the signal.

The example coupler (CPL) 700 of FIG. 7 comprises first and second connection nodes 760, 770 and first and second resistances 710, 720 connected in series between the first and second connection nodes via a mid point node 750. The first and second resistances may or may not be matched. The coupler 700 also comprises a capacitance 730 connected between the mid point node and ground and optionally an inductance 740 connected in parallel with the capacitance. At least one of the components 710, 720, 730 and 740 are tunable to provide a possibility to achieve the optimum coupling as described above.

In some embodiments, the coupler comprises one or more resistances only. In some embodiments, the coupler comprises one or more resistances and only one of the capacitance 730 and the inductance 740 and in other embodiments the coupler comprises one or more resistances and both the capacitance 730 and the inductance 740.

If the filter arrangement(s) are attenuating the unwanted signal effectively, the component values of the coupler will typically be large compared to 50 ohm (to avoid degrading the desired signal).

As mentioned in connection with FIG. 4, the coupler function may also be achieved by a mutual inductance between the first inductances of a pair of filter arrangements. A structure with such a mutual inductance is illustrated in FIG. 4, and it may or may not be complemented by a coupler such as the one described in connection with FIG. 7.

Figure 8:
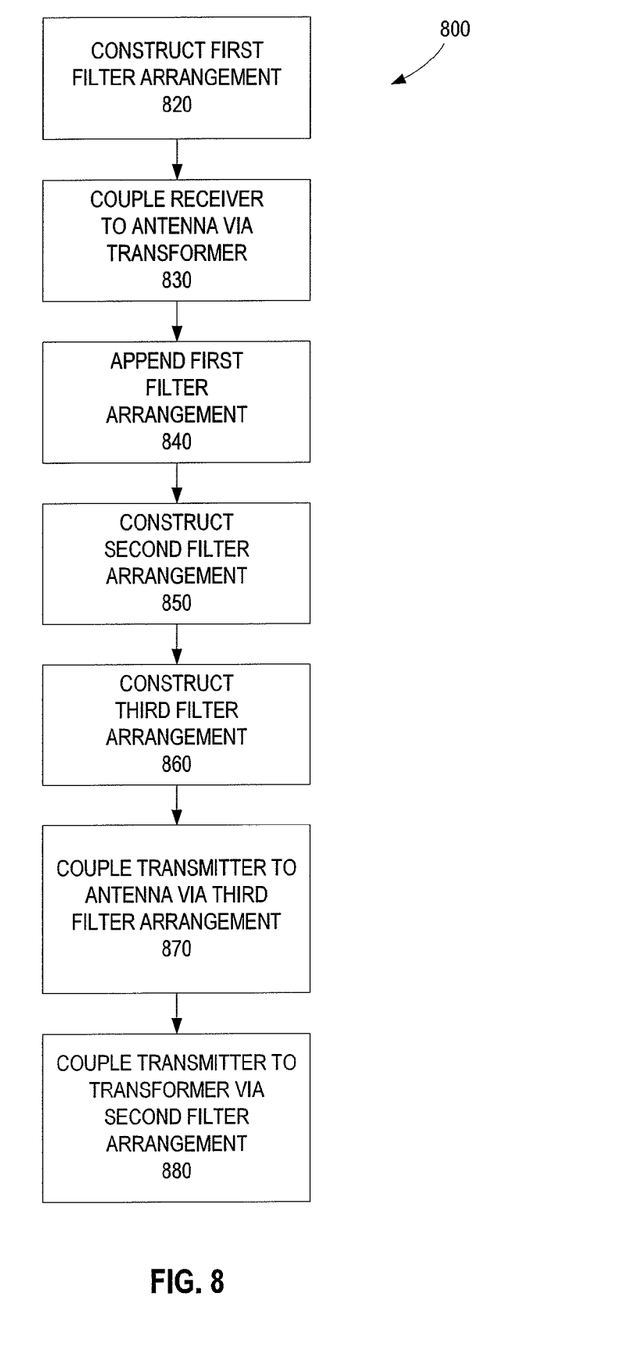
FIG. 8 is a flowchart illustrating example method steps according to some embodiments.

FIG. 8 illustrates an example method 800 of blocking transmit and receive frequency signals according to some embodiments. The method starts in 820, where a suitable first filter arrangement is constructed based on transmit and receive frequencies. The construction in 820 has been exemplified above in connection to e.g., FIGS. 3a and 3b and may typically be chosen to provide a FA with high impedance at transmit frequency and low impedance at receive frequency. In 830, a signal transmission and reception arrangement (e.g., an antenna) is connected to a first node of a first side of a transformer and a receiver is connected to a first node of a second side of the transformer. The first filter arrangement is connected to a second node of the first side of the transformer in 840.

In 850, a suitable second filter arrangement is constructed based on transmit and receive frequencies. The construction in 850 has been exemplified above in connection to e.g., FIGS. 3a and 3b and may typically be chosen to provide a FA with high impedance at transmit frequency and low impedance at receive frequency. In 860, a suitable third filter arrangement is constructed based on transmit and receive frequencies. The construction in 860 has been exemplified above in connection to e.g., FIGS. 3a and 3b and may typically be chosen to provide a FA with high impedance at receive frequency and low impedance at transmit frequency.

The signal transmission and reception arrangement is connected to a first node of the third filter arrangement and a transmitter is connected to a second node of the third filter arrangement in 870. The transmitter is connected to a first node of the second filter arrangement in 880 and the second node of the transformer of the transmit frequency blocking arrangement is connected to a second node of the second filter arrangement.

Other details of the method may be extracted from the transceiver embodiments described above.

The described embodiments and their equivalents may be realized in hardware. They may be performed by specialized circuits such as for example application-specific integrated circuits (ASIC), by discrete components, or by a combination thereof. All such forms are contemplated to be within the scope of the invention.

The invention may be embodied within an electronic apparatus (such as a wireless or wired communication device) comprising circuitry/logic according to any of the embodiments. The electronic apparatus may, for example, be a portable or handheld mobile radio communication equipment, a mobile radio terminal, a mobile telephone, a base station, a communicator, an electronic organizer, a smartphone, a computer, a notebook, or a mobile gaming device.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A transceiver front-end of a communication device comprising:
   a transmit frequency blocking arrangement connected to a signal transmission and reception node and a transmitter node, transmit frequency blocking arrangement having a blocking frequency interval associated with the transmit frequency and a non-blocking frequency interval associated with the receive frequency, said transmit frequency blocking arrangement being configured to block passage of transmit frequency signals between the signal transmission and reception arrangement and the receiver;
   a receive frequency blocking arrangement connected to the signal transmission and reception node and a receiver node, said receive frequency blocking arrangement having a blocking frequency interval associated with the receive frequency and a non-blocking frequency interval associated with the transmit frequency, said receive frequency blocking arrangement being configured to block passage of transmit frequency signals between the signal transmission and reception arrangement and the transmitter;
   wherein said transmit frequency blocking arrangement comprises a network of passive components including at least one transformer and a first filter arrangement configured to have a higher impedance value at the transmit frequency than at the receive frequency; and
   wherein said receive frequency blocking arrangement comprises a second filter arrangement configured to have a higher impedance value at the transmit frequency than at the receive frequency, and a third filter arrangement configured to have a higher impedance value at the receive frequency than at the transmit frequency.

2. The transceiver front-end of claim 1 wherein the first, second, and third filter arrangements each comprise a first inductance connected in parallel with a first capacitance to form a blocking frequency resonance arrangement.

3. The transceiver front-end of claim 2 wherein the first, second, and third filter arrangements each further comprise at least one of a second inductance and a second capacitance connected in series with the blocking frequency resonance arrangement to form a non-blocking frequency resonance arrangement.

4. The transceiver front-end of claim 1 wherein:
   the signal transmission and reception arrangement node is connected to a first node of the third filter arrangement;
   the transmitter node is connected to a second node of the third filter arrangement and to a first node of the second filter arrangement, and
   a second node of the second filter arrangement is connected to a second node of a first side of the transformer of the transmit frequency blocking arrangement.

5. The transceiver front-end of claim 4 wherein:
   the signal transmission and reception arrangement node is connected to a first node of a first side of the transformer of the transmit frequency blocking arrangement;
   the first filter arrangement is connected to the second node of the first side of the transformer of the transmit frequency blocking arrangement; and
   the receiver node is connected to a first node of the second side of the transformer of the transmit frequency blocking arrangement.

6. The transceiver front-end of claim 5 wherein the transmit frequency blocking arrangement further comprises a fourth filter arrangement connected to a second node of the second side of the transformer of the transmit frequency blocking arrangement.

7. The transceiver front-end of claim 5 wherein a second node of the second side of the transformer of the transmit frequency blocking arrangement is connected to a second receiver node.

8. The transceiver front-end of claim 1 wherein the network of passive components further comprises a coupler connected between the first side of the transformer and the second side of the transformer and adapted to cancel a remaining signal at the transmit frequency.

9. The transceiver front-end of claim 8 wherein the coupler comprises one or more resistances connected between the first side of the transformer and the second side of the transformer.

10. The transceiver front-end of claim 9 wherein the coupler comprises:
    first and second matched resistances connected in series between the first side of the transformer and the second side of the transformer via a mid point node; and
    a third capacitance connected between the mid point node and ground.

11. The transceiver front-end of claim 9 wherein the coupler further comprises a third inductance connected in parallel with the third capacitance.

12. The transceiver front-end of claim 8 wherein the first side of the transformer is adapted to have an opposite phase compared to the second side of the transformer.

13. The transceiver front-end of claim 4 further comprising fourth and fifth filter arrangements, and wherein:
    the transmit frequency blocking arrangement comprises first and second transformers;
    the signal transmission and reception arrangement node is connected to a first node of a first side of the first transformer;
    the receiver node is connected to a first node of a second side of the first transformer;
    a second node of the first side of the first transformer is connected to a first node of a first side of the second transformer;
    the first filter arrangement is connected to a second node of the first side of the second transformer;

a second node of the second side of the first transformer is connected to the fourth filter arrangement;

a first node of a second side of the second transformer is connected to the fifth filter arrangement; and a second node of the second side of the second transformer is connected to a second receiver node.

14. A transceiver front-end of a communication device comprising:

a transmit frequency blocking arrangement connected to a signal transmission and reception node and a transmitter node, transmit frequency blocking arrangement having a blocking frequency interval associated with the transmit frequency and a non-blocking frequency interval associated with the receive frequency, said transmit frequency blocking arrangement being configured to block passage of transmit frequency signals between the signal transmission and reception arrangement and the receiver;

a receive frequency blocking arrangement connected to the signal transmission and reception node and a receiver node, said receive frequency blocking arrangement having a blocking frequency interval associated with the receive frequency and a non-blocking frequency interval associated with the transmit frequency, said receive frequency blocking arrangement being configured to block passage of transmit frequency signals between the signal transmission and reception arrangement and the transmitter;

wherein said receive frequency blocking arrangement comprises a network of passive components including at least one transformer and a first filter arrangement configured to have a higher impedance value at the receive frequency than at the transit frequency; and wherein said transmit frequency blocking arrangement comprises a second filter arrangement configured to have a higher impedance value at the receive frequency than at the transmit frequency, and a third filter arrangement adapted to have a higher impedance value at the transmit frequency than at the receive frequency.

15. A transceiver including a transmitter, a receiver, and a transceiver front end, said transceiver front end comprising:

a transmit frequency blocking arrangement connected to a signal transmission and reception node and a transmitter node, transmit frequency blocking arrangement having a blocking frequency interval associated with the transmit frequency and a non-blocking frequency interval associated with the receive frequency, said transmit frequency blocking arrangement being configured to block passage of transmit frequency signals between the signal transmission and reception arrangement and the receiver;

a receive frequency blocking arrangement connected to the signal transmission and reception node and a receiver node, said receive frequency blocking arrangement having a blocking frequency interval associated with the receive frequency and a non-blocking frequency interval associated with the transmit frequency, said receive frequency blocking arrangement being configured to block passage of transmit frequency signals between the signal transmission and reception arrangement and the transmitter;

wherein said transmit frequency blocking arrangement comprises a network of passive components including at least one transformer and a first filter arrangement configured to have a higher impedance value in the blocking frequency interval than in the non-blocking frequency interval; and wherein said receive frequency blocking arrangement comprises a second filter arrangement configured to have a higher impedance value at the transmit frequency than at the receive frequency, and a third filter arrangement adapted to have a higher impedance value at the receive frequency than at the transmit frequency.

16. A transceiver including a transmitter, a receiver, and a transceiver front end, said transceiver front end comprising:

a transmit frequency blocking arrangement connected to a signal transmission and reception node and a transmitter node, transmit frequency blocking arrangement having a blocking frequency interval associated with the transmit frequency and a non-blocking frequency interval associated with the receive frequency, said transmit frequency blocking arrangement being configured to block passage of transmit frequency signals between the signal transmission and reception arrangement and the receiver;

a receive frequency blocking arrangement connected to the signal transmission and reception node and a receiver node, said receive frequency blocking arrangement having a blocking frequency interval associated with the receive frequency and a non-blocking frequency interval associated with the transmit frequency, said receive frequency blocking arrangement being configured to block passage of transmit frequency signals between the signal transmission and reception arrangement and the transmitter;

wherein one of said transmit frequency blocking arrangement and said receive frequency blocking arrangement comprises a network of passive components including at least one transformer and a first filter arrangement configured to have a higher impedance value in the blocking frequency interval than in the non-blocking frequency interval; and wherein the other of said transmit frequency blocking arrangement and said receive frequency blocking arrangement comprises a second filter arrangement configured to have a higher impedance value at the non-blocking frequency interval than at the blocking frequency interval, and a third filter arrangement configured to have a higher impedance value at the blocking frequency interval than at the non-blocking frequency interval.

17. A communication device comprising a transceiver including a transmitter, a receiver, and a transceiver front end, said transceiver front end comprising:

a transmit frequency blocking arrangement connected to a signal transmission and reception node and a transmitter node, transmit frequency blocking arrangement having a blocking frequency interval associated with the transmit frequency and a non-blocking frequency interval associated with the receive frequency, said transmit frequency blocking arrangement being configured to block passage of transmit frequency signals between the signal transmission and reception arrangement and the receiver;

a receive frequency blocking arrangement connected to the signal transmission and reception node and a receiver node, said receive frequency blocking arrangement having a blocking frequency interval associated with the receive frequency and a non-blocking frequency interval associated with the transmit frequency, said receive frequency blocking arrangement being configured to block passage of transmit frequency signals between the signal transmission and reception arrangement and the transmitter;

wherein one of said transmit frequency blocking arrangement and said receive frequency blocking arrangement comprises a network of passive components including at least one transformer and a first filter arrangement configured to have a higher impedance value in the blocking frequency interval than in the non-blocking frequency interval; and wherein the other of said transmit frequency blocking arrangement and said receive frequency blocking arrangement comprises a second filter arrangement configured to have a higher impedance value at the non-blocking frequency interval than at the blocking frequency interval, and a third filter arrangement configured to have a higher impedance value at the blocking frequency interval than at the non-blocking frequency interval.

\* \* \* \* \*